Sept. 8, 1964 L. DI RICCO ET AL 3,148,082
MAGNETIC RECORDING MEDIA
Filed June 26. 1961
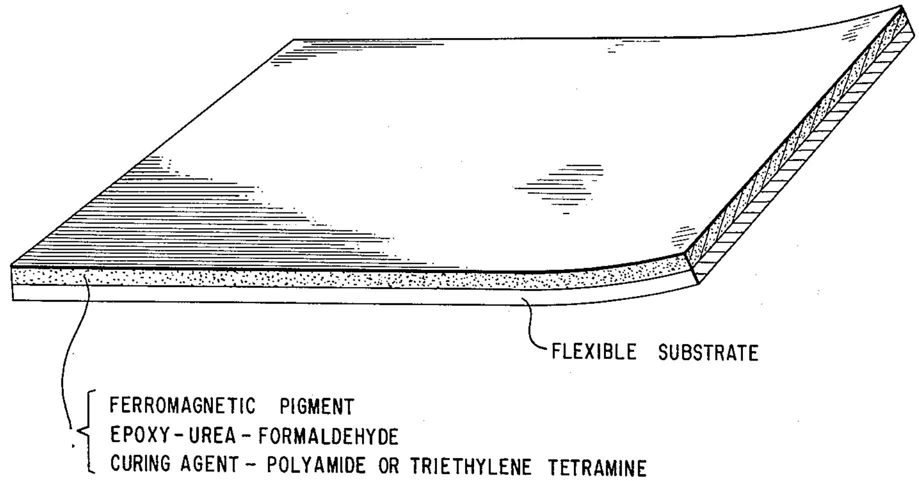
*INVENTORS*
LEO DI RICCO
JOHN P. DEL FAVERO United States Patent Office 3,148,082
Patented Sept. 8, 1964

3,148,082
MAGNETIC RECORDING MEDIA

Leo Di Ricco and John P. Del Favero, both of San Jose, Calif., assignors to International Business Machines Corporation, New York, N.Y., a corporation of New York Filed June 26, 1961, Ser. No. 119,346
1 Claim. (Cl. 117—132)

Our invention relates to a flexible, magnetic recording media and, more particularly, to magnetic tapes, stripes, and discs, and processes for their preparation.

Thermosetting resin finish coatings are known for their hardness, abrasion resistance, toughness, and corrosion resistance. Epoxy resin coatings are typical of this class of finishes and have found use as maintenance primers and finishes for wood, metal and concrete in marine and other corrosive environments, as well as use as automotive and aircraft primers and finishes.

While such finishes have a high degree of flexibility when compared with the rigid films, and are suitable for uses where considerable vibrations occur, these formulations are known to break at points where the cured films are bent, drawn or stretched suddenly over a wide angle; for example, in automobile wrecks.

Due to this known breakability and lack of adaptability, these coatings have not been previously used for manufacturing magnetic tapes where a high degree of flexibility is required, and where the article must be bent repeatedly through large angles; for example, when tapes are bent around capstans. The magnetic tape industry has had to content itself with highly flexible thermoplastic vehicles for magnetic pigments, although the resulting films wear poorly and are somewhat spatially unstable at higher ambient temperatures. This spatial instability has limited the number of backing materials which can be effectively utilized to those which have a high degree of spatial stability under varying temperature conditions.

We have now discovered that thermosetting resins can be utilized to form magnetic tapes and stripes. In fact, our new tapes can be bent double without breaking the thermosetting magnetic pigment vehicle. This discovery allows the tape industry to utilize backing materials which are less spatially stable, as the coatings per se are essentially spatially stable.

The magnetic recording media of our invention comprises: magnetic pigments, a vehicle and a flexible substrate (backing material). The backing material can be any of the commonly utilized backing materials such as polyethylene terephthalate (Mylar) films, acetate films or temperature-stable metal foils, such as brass, copper aluminum and tin. These backing materials are generally 0.5–5 mils in thickness.

The substrate materials should be cleaned, i.e., the surface of the film should be dry and should not be contaminated with oils or other solvents which reduce adhesion of the magnetic coatings to the substrate. The surface of the substrate being coated should be lint and debris free, as such particles tend to vary the thickness of the magnetic film and reduce the surface smoothness of the final magnetic films. Where adhesion is poor, the magnetic coating breaks when bent double and will flake away from the substrate. The substrate can be cleaned by soaking in a solvent for polar organic liquids, a solvent for non-polar organic liquids, possibly washed with a detergent water solution and dried.

The ferromagnetic pigments utilized in our invention are well known to the art. Magnetic iron oxide is an example of such a pigment. Powders of ferritic materials can also be utilized to advantage. Examples of such ferrite materials include spinel structure powders having the composition $MeFe_2O_4$ where Me is a divalent transition metal ion such as $Mn^{++}$, $Fe^{++}$, $Ni^{++}$, $Co^{++}$, $Cu^{++}$, $Zn^{++}$, $Cd^{++}$, or $Mg^{++}$, or mixtures thereof. These materials should have a particle size of from about 0.2 to about 2.0$\mu$ and, preferably, of about 0.5 to about 1.5$\mu$. Preferably, the pigments included in the thermosetting resins are from about 20 to about 67 percent by weight of the total coating.

Many flexible thermosetting resins might be utilized as a vehicle for the above pigments in preparing the magnetic recording media. Examples of such materials could include thermosetting epoxy-based resins, such as, epoxy-phenolic resins, viz. epoxy-phenolic resins modified by the addition of polyvinylmethyl ether, methylphenylpolysiloxane, and hexahydrophthalic anhydride, polyurethanes, for example, one made by reacting phenol-blocked polyisocyanate and polyester resin, alkyds, polyesters and urea-formaldehyde resins. These last named resins may include Beetle Resin 227–8 (manufactured by the American Cyanamid Corporation). The thermosetting resins utilized in our invention contain, as the major ingredient, epoxy resins and, specifically, are epoxy-urea-formaldehyde resins which are cured by the addition of either polyamide resins or triethylene tetramine.

The epoxy-bisphenol intermediate resins which are utilized in preparing epoxy-urea-formaldehyde resins have melting points of from about 60° to about 160° C. and, preferably, melting points of from about 65° to about 155° C.; and epoxide equivalents of from about 400 to about 4200. Preferably, the epoxide equivalent is from about 450 to about 4000. Still more preferably, the melting point is from about 90° to about 135° C. and the epoxide equivalent is from about 850 to about 2500. Epoxide equivalent is defined as the grams of resin containing one gram equivalent of epoxide.

The usual additives are utilized in formulating the desired vehicles. For example, solvents and flow control agents such as diacetone alcohol, xylene, toluene, polyethylene isoglycate acetate, methyl isobutyl ketone, isophorone, and ethylamyl ketone may be used as well as plasticizers such as methylphenylpolysiloxane resin, polyoxyethylene glycol, and polyester resin.

As previously indicated, epoxy-urea-formaldehyde resins are utilized as vehicles in making the magnetic media of our invention. Generally from about 65 to about 85 percent epoxy resin is required and from about 35 to about 15 percent by weight of urea-formaldehyde resin.

In the drawing, there is shown a perspective view of a piece of magnetic tape. On the flexible substrate is the magnetic coating comprising a ferromagnetic pigment dispersed throughout an epoxy-urea-formaldehyde binder which has been cured by the addition of either polyamide or triethylene tetramine.

The following examples more specifically illustrate our invention; however, it is not intended that our invention be limited to the specific formulations, or procedures set out. Rather, it is intended that all equivalents obvious to those skilled in the art be included within the scope of our invention, as claimed:

*Example I*

A coating was prepared by dissolving 66.9 g. of an epoxy resin having an epoxide equivalent of 425–550 and a melting point of 65°–75° C. (Epon 1001, manufactured by Shell Chemical Co.), 50 g. each of methylisobutyl ketone, a lower molecular weight polyoxyethylene glycol (Cellosolve) and xylene; adding 5.6 g. of butylated urea formaldehyde resin; and mixing in 102.6 g. of magnetic iron oxide particles.

This mixture was milled for 72 hours at 100–200 r.p.m. A curing agent mixture was prepared from 30 g. of a polyamide resin (Versamid 115, manufactured by General Mills Corporation) and 10 g. each of MIBK, Cellosolve and xylene. After milling, the curing agent was added to the base mixture with agitation adjusted to Zahn No. 3 cup 14.5 seconds viscosity and coated on a Mylar substrate. The coating was allowed to cool at room temperature for two days and found to adhere tenaciously to the Mylar during flexing.

*Example II*

In an experiment similar to that of Example I, 34 g. of a mixture of 4.2 g. of triethylene tetramine (6 percent by weight of resin) and a mixture of 10 g. each MIBK, Cellosolve and xylene were substituted for the Versamid curing agent. Comparable results were obtained after a total cure of two to three days.

Now, having described our invention, we claim:

A magnetic recording medium having, in combination, a flexible substrate and, adhered thereto, a thin film of ferromagnetic pigment contained in a cured vehicle consisting essentially of a major amount of an epoxy resin having an epoxide equivalent of about 400–

4200 and a melting point of about 60–160° C., a urea-formaldehyde resin, and a curing agent which is selected from the class consisting of polyamide resins and triethylene tetramine, said cured vehicle being sufficiently flexible so that the recording medium can be bent through a wide angle without the ferromagnetic film breaking.

References Cited in the file of this patent

UNITED STATES PATENTS

| | | |
|---|---|---|
| 2,683,131 | Cass | July 6, 1954 |
| 3,028,251 | Nagel | Apr. 3, 1962 |
| 3,035,939 | Edwards | May 22, 1962 |

OTHER REFERENCES

Haines: IBM Technical Disclosure Bulletin, vol. 2, No. 4, page 28, December 1959.

Zimmerman and Lavine: "Handbook of Material Trade Names," Supplement I (page 257), and Supplement III (page 164), TP 151 Z5, 1953 C. 3 and C. 5.